United States Patent
Arakawa

(10) Patent No.: US 10,638,015 B2
(45) Date of Patent: Apr. 28, 2020

(54) COMPUTER-READABLE RECORDING MEDIUM AND FACSIMILE MACHINE

(71) Applicant: BROTHER KOGYO KABUSHIKI KAISHA, Nagoya-shi, Aichi-ken (JP)

(72) Inventor: Eiji Arakawa, Aichi (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 223 days.

(21) Appl. No.: 15/274,231

(22) Filed: Sep. 23, 2016

(65) Prior Publication Data

US 2017/0180600 A1 Jun. 22, 2017

(30) Foreign Application Priority Data

Dec. 22, 2015 (JP) .................... 2015-249332

(51) Int. Cl.
H04N 1/327 (2006.01)
H04N 1/00 (2006.01)
H04N 1/44 (2006.01)

(52) U.S. Cl.
CPC ....... H04N 1/32765 (2013.01); H04N 1/0044 (2013.01); H04N 1/00413 (2013.01);
(Continued)

(58) Field of Classification Search
CPC .................................. H04N 1/32765
See application file for complete search history.

(56) References Cited

U.S. PATENT DOCUMENTS 6,914,964 B1* 7/2005 Levine .................... H04M 3/56
379/52
2003/0012379 A1* 1/2003 Foth ...................... H04N 1/4406
380/243
(Continued)

FOREIGN PATENT DOCUMENTS

JP 2002033729 A * 1/2002
JP 2005-277794 A 10/2005
(Continued)

OTHER PUBLICATIONS

Notification of Reasons for Rejection issued in related Japanese Patent Application No. 2015-249332, dated Nov. 5, 2019.

*Primary Examiner* — Ted W Barnes
(74) *Attorney, Agent, or Firm* — Merchant & Gould P.C.

(57) ABSTRACT

A non-transitory computer-readable recording medium storing computer-readable instructions for a mobile terminal is provided. The computer readable instructions may cause the mobile terminal to transmit authentication information, indicating authorization of the mobile terminal to instruct a facsimile machine to execute a facsimile transmitting action with use of first sender information, to a facsimile machine; determine receipt of the first sender information transmitted from the facsimile machine; transmit first facsimile instructing information for instructing the facsimile machine to execute the facsimile transmitting action with use of the received first sender information to the facsimile machine in response to determination of receiving the first sender information; and transmit second facsimile instructing information for instructing the facsimile machine to execute the facsimile transmitting action without using the first sender information to the facsimile machine in response to determination of not receiving the first sender information.

14 Claims, 9 Drawing Sheets

(52) U.S. Cl.
CPC ... *H04N 1/4433* (2013.01); *H04N 2201/0093* (2013.01); *H04N 2201/0094* (2013.01)

(56) References Cited

U.S. PATENT DOCUMENTS

| | | | | |
|---|---|---|---|---|
| 2004/0023656 A1* | 2/2004 | Purdy | ............... | H04L 29/06027 455/445 |
| 2005/0275871 A1* | 12/2005 | Baird | ................ | H04L 12/2854 358/1.15 |
| 2007/0223034 A1* | 9/2007 | Matsumoto | ........... | G06F 3/1204 358/1.15 |
| 2007/0268906 A1* | 11/2007 | Shozaki | ............ | H04L 29/12047 370/392 |
| 2008/0007790 A1* | 1/2008 | Fujita | ................ | H04N 1/00244 358/400 |
| 2008/0107308 A1* | 5/2008 | Ward | ....................... | G06F 21/32 382/115 |
| 2009/0015876 A1* | 1/2009 | Brown | ............... | H04N 1/32112 358/405 |
| 2009/0183244 A1* | 7/2009 | Saraf | ..................... | G06F 21/604 726/6 |
| 2010/0002255 A1* | 1/2010 | Fukushima | ........ | H04N 1/00206 358/1.15 |
| 2010/0007915 A1* | 1/2010 | Ogino | .................. | H04N 1/0044 358/1.15 |
| 2012/0200876 A1* | 8/2012 | Furuta | ................ | H04N 1/32101 358/1.13 |
| 2013/0086670 A1* | 4/2013 | Vangpat | ................ | H04L 9/3213 726/8 |
| 2014/0253965 A1* | 9/2014 | Asai | ...................... | G06F 3/1205 358/1.15 |
| 2014/0278511 A1* | 9/2014 | Fielding | ................. | G06Q 50/22 705/2 |
| 2014/0376045 A1* | 12/2014 | Oyoshi | .............. | H04N 1/32128 358/1.15 |
| 2015/0116785 A1* | 4/2015 | Yamazaki | .......... | H04N 1/32112 358/402 |
| 2015/0207949 A1* | 7/2015 | Takeo | ................ | H04N 1/00875 358/1.13 |
| 2016/0094732 A1* | 3/2016 | Nakamura | ........... | H04N 1/3209 358/440 |
| 2017/0041496 A1* | 2/2017 | Lehavi | ............... | H04N 1/00106 |
| 2017/0054866 A1* | 2/2017 | Cho | .................... | H04N 1/32101 |

FOREIGN PATENT DOCUMENTS

| | | | | |
|---|---|---|---|---|
| JP | 2005277794 A | * | 10/2005 | |
| JP | 2009-153209 A | | 7/2009 | |
| JP | 2009153209 A | * | 7/2009 | |
| JP | 2010-21855 A | | 1/2010 | |
| JP | 2012-165158 A | | 8/2012 | |
| JP | 2015-5815 A | | 1/2015 | |
| JP | 2015005815 A | * | 1/2015 | ......... H04N 1/32128 |
| JP | 2017118228 A | * | 6/2017 | ........... H04N 1/4433 |
| KR | 20150140481 A | * | 12/2015 | |

\* cited by examiner

| First Sender Information | So-and-so Corporation, Administration Department |

FIG. 2A

| Registration Information | Authentication Key |
|---|---|
| term-A | 1234 |
| ⋮ | ⋮ |

FIG. 2B

| Second Sender Information | So-and-so Corporation, Sales Department |

FIG. 2C

| Device ID | Authentication Key |
|---|---|
| MFP-A | 1234 |
| ⋮ | ⋮ |

FIG. 2D

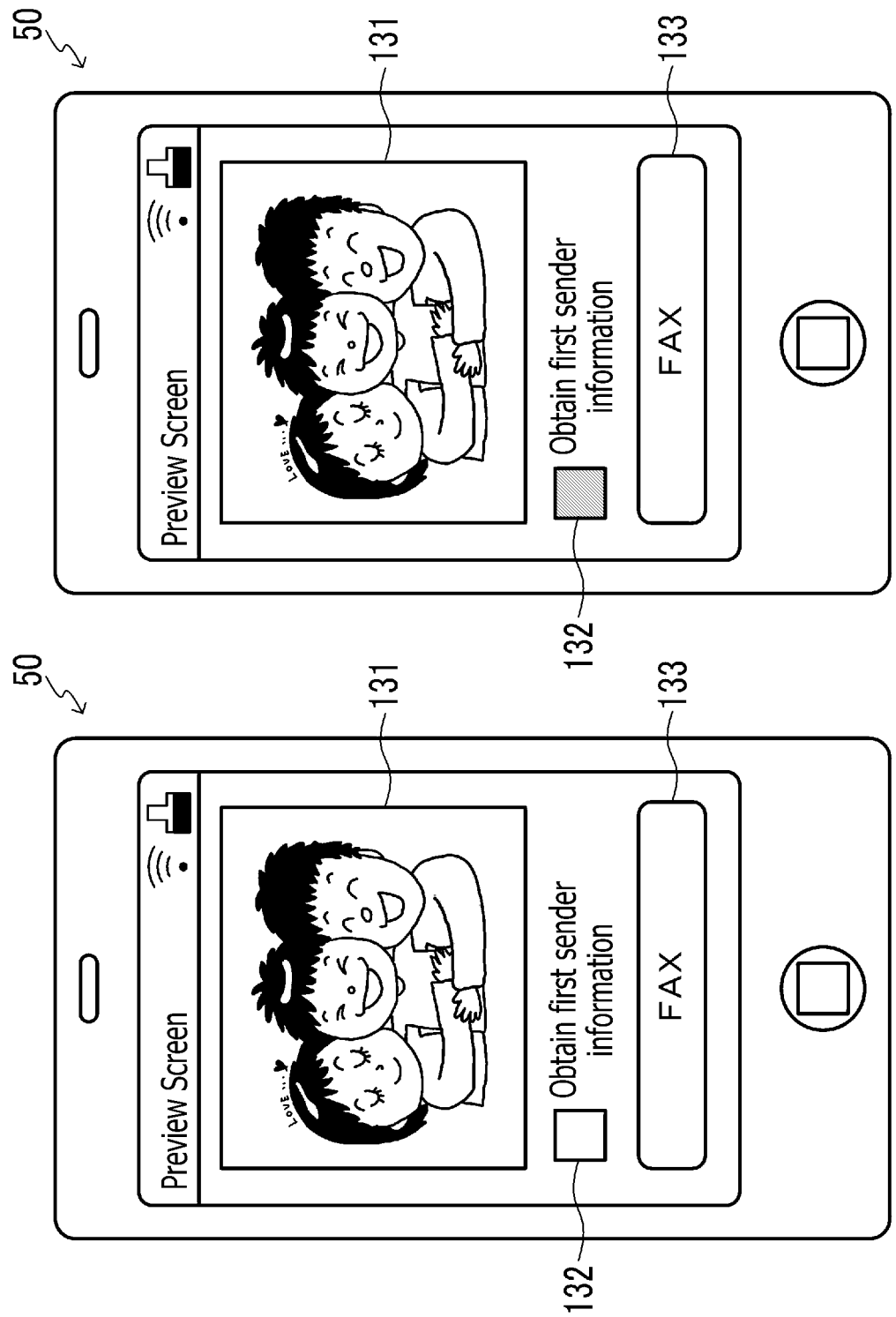

COMPUTER-READABLE RECORDING MEDIUM AND FACSIMILE MACHINE

CROSS-REFERENCE TO RELATED APPLICATION

This application claims priority under 35 U.S.C. § 119 from Japanese Patent Application No. 2015-249332, filed on Dec. 22, 2015. The entire subject matter of the application is incorporated herein by reference.

BACKGROUND

Technical Field

The following description relates to one or more aspects of a facsimile machine and a computer-readable recording medium for storing a computer-usable program, which may control a mobile terminal to manipulate a facsimile machine to execute facsimile transmission.

Related Art

A facsimile machine, which may transmit information including facsimile data and station ID to an external device according to facsimile transmission protocol, is known. The station ID is a string of text, which may be registered with the facsimile machine to identify a sender of the facsimile data, e.g., a name of an organization, a department, etc. The station ID may be appended to a transmitting subscriber identification (TSI) command to be sent to a receiver facsimile machine and may be appended to an image, which is developed based on the facsimile data, as a header. Thus, the receiver facsimile machine may recognize the sender of the facsimile data by the station ID.

SUMMARY

In recent years, application programs to be installed in mobile terminals to use the mobile terminals in a facsimile transmission network have been introduced. The application programs may control the mobile terminals to be connected with a facsimile machine and manipulate the facsimile machine to activate facsimile transmission. In this regard, however, a method how the mobile terminal should process the station ID may not often be considered in the application program. Therefore, when the mobile terminal attempts to manipulate the facsimile machine to operate the facsimile transmission, inconvenience with the station ID may be caused.

The present disclosure is advantageous in that a computer-readable recording medium for storing a computer-usable program, which is installable in a mobile terminal to control a facsimile machine to operate facsimile transmission, is provided so that the mobile terminal may instruct the facsimile machine to operate facsimile transmission with appropriate use of information of a sender.

According to an aspect of the present disclosure, a non-transitory computer-readable recording medium storing computer-readable instructions for a mobile terminal including a communication interface is provided. The computer readable instructions, when executed by a processor of the mobile terminal, cause the mobile terminal to transmit authentication information to a facsimile machine capable of executing a facsimile transmitting action through the communication interface, the authentication information indicating that the mobile terminal is authorized to instruct the facsimile machine to execute the facsimile transmitting action with use of first sender information, the first sender information being registered with the facsimile machine to indicate a sender of image data to be transmitted in the facsimile transmitting action; determine receipt of the first sender information transmitted in reply to the authentication information from the facsimile machine through the communication interface; transmit first facsimile instructing information to the facsimile machine through the communication interface in response to determination of receiving the first sender information transmitted by the facsimile machine, the first facsimile instructing information including information to instruct the facsimile machine to execute the facsimile transmitting action with use of the received first sender information; and transmit second facsimile instructing information to the facsimile machine through the communication interface in response to determination of not receiving the first sender information from the facsimile machine, the second facsimile instructing information including information to instruct the facsimile machine to execute the facsimile transmitting action without using the first sender information.

According to another aspect of the present disclosure, a non-transitory computer-readable recording medium storing computer-readable instructions for a mobile terminal having an input interface and a communication interface is provided. The computer readable instructions, when executed by a processor of the mobile terminal, cause the mobile terminal to accept one of a first instructing operation and a second instructing operation through the input interface, the first instructing operation corresponding to an instruction for a facsimile machine to execute a facsimile transmitting action with use of first sender information, the first sender information being registered with the facsimile machine to indicate a sender of image data to be transmitted in the facsimile transmitting action, and the second instructing operation corresponding to an instruction for the facsimile machine to execute the facsimile transmitting action without using the first sender information; receive the first sender information from the facsimile machine through the communication interface and transmit first facsimile instructing information to the facsimile machine through the communication interface in response to acceptance of the first instructing operation, the first facsimile instructing information including information to instruct the facsimile machine to execute the facsimile transmitting action with use of the received first sender information; and transmit second facsimile instructing information to the facsimile machine through the communication interface in response to acceptance of the second instructing operation, the second facsimile instructing information including information to instruct the facsimile machine to execute the facsimile transmitting action without using the first sender information.

According to another aspect of the present disclosure, a facsimile machine, including a communication interface; a facsimile device configured to execute a facsimile transmitting action; a memory configured to store first sender information and registered authentication information, the first sender information indicating a sender of image data to be transmitted in the facsimile transmitting action, and the registered authentication information indicating that the sender is authorized to instruct the facsimile device to execute the facsimile transmitting action with use of the first sender information; and a control device is provided. The control device is configured to receive transmitted authentication information from a mobile terminal through the communication interface; determine identicalness of the transmitted authentication information with the registered authentication information; transmit the first sender information stored in the memory to the mobile terminal through the communication interface in response to determination that the transmitted authentication information is identical with the registered authentication information; and receive first facsimile instruction information from the mobile terminal, to which the first sender information was transmitted, through the communication interface, the first facsimile instruction information including information to instruct the facsimile device to execute the facsimile transmitting action with use of the first sender information; and control the facsimile device to execute the facsimile transmitting action according to the received first facsimile instruction information.

According to another aspect of the present disclosure, a facsimile machine, including a communication interface; an input interface; a facsimile device configured to execute a facsimile transmitting action; a memory configured to store first sender information, the first sender information indicating a sender of image data to be transmitted in the facsimile transmitting action; and a control device is provided. The control device is configured to accept an instructing operation to instruct the facsimile device to execute the facsimile transmitting action through the input interface, and, in response to acceptance of the instructing operation, control the facsimile device to execute the facsimile transmitting action with use of the first sender information stored in the memory; and receive facsimile instructing information from a mobile terminal through the communication interface, the facsimile instructing information including information to instruct the facsimile device to execute the facsimile transmitting action, and, in response to receiving the facsimile instructing information, control the facsimile device to execute the facsimile transmitting action with use of second sender information, the second sender information being included in the facsimile instructing information and registered with the mobile terminal to indicate another sender of the image data to be transmitted in the facsimile transmitting action.

BRIEF DESCRIPTION OF THE ACCOMPANYING DRAWINGS

FIGS. 2A-2D illustrate records of information to be stored in data storage areas in memories of the MFP and the mobile terminal according to the illustrative embodiment of the present disclosure.

FIG. 9A is an illustrative view of a preview screen in the display with a checkbox being usable in the mobile terminal according to the embodiment of the present disclosure. FIG. 9B is an illustrative view of the preview screen in the display with the checkbox being unusable in the mobile terminal according to the embodiment of the present disclosure.

DETAILED DESCRIPTION

Hereinafter, an illustrative embodiment according to an aspect of the present disclosure will be described with reference to the accompanying drawings. It is noted that various connections may be set forth between the elements in the following description. It is noted that these connections in general and, unless specified otherwise, may be direct or indirect and that this specification is not intended to be limiting in this respect. Aspects of the present disclosure may be implemented on one or more CPUs, one or more circuits, including ASICs, and a combination of any of these, or in computer software as programs storable on computer-readable media including but not limited to RAMs, ROMs, flash memories, EPROMs, CD-media, DVD-media, temporary storage, hard disk drives, floppy drives, permanent storage, and the like.

Figure 1:
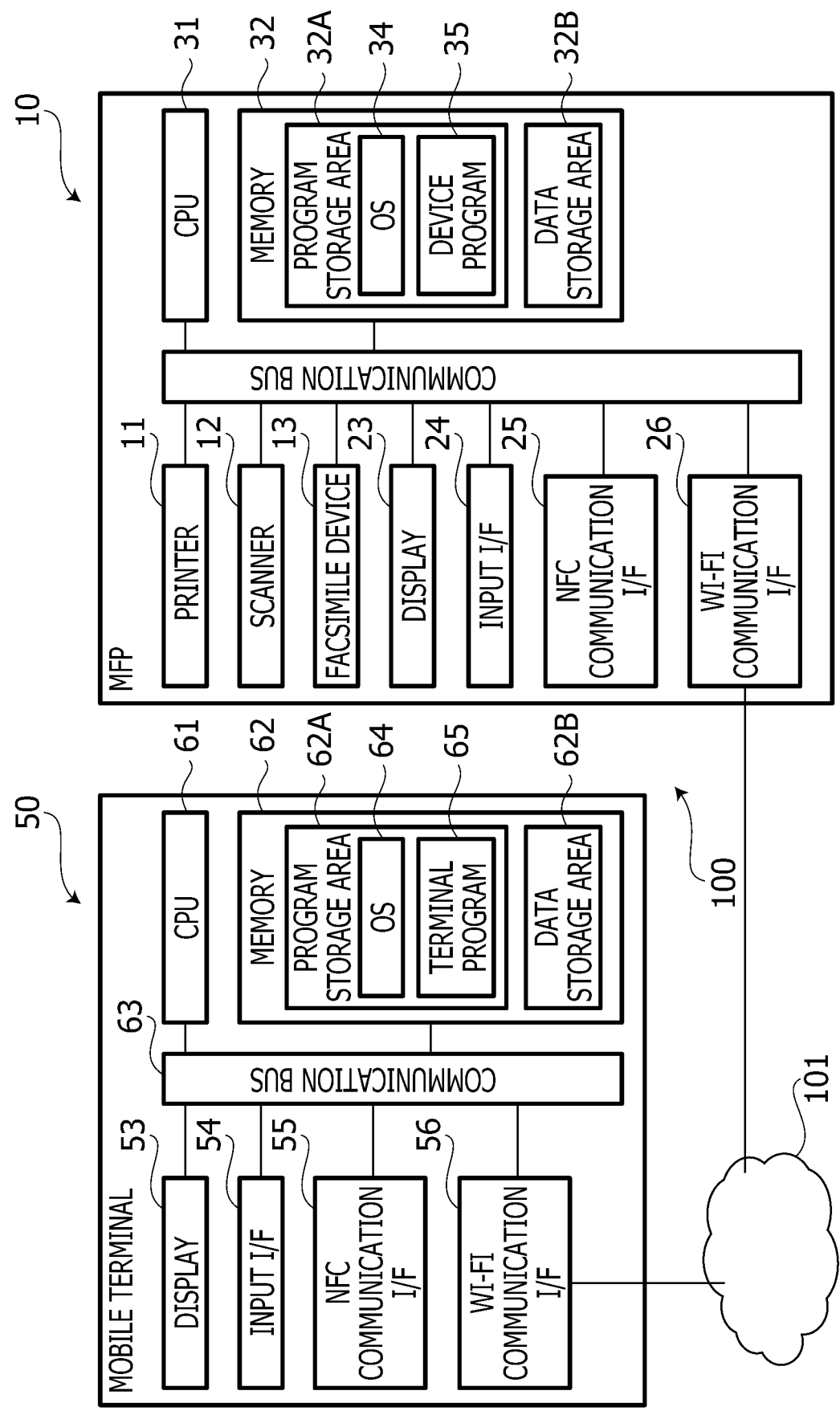
FIG. 1 is a block diagram showing a configuration of a system including an MFP and a mobile terminal according to an illustrative embodiment of the present disclosure.

A system 100 shown in FIG. 1 according to the present embodiment includes an MFP 10 and a mobile terminal 50, which are capable of communicating with each other wirelessly directly or indirectly through a communication network 101. The communication network 101 may be, for example, wired LAN, wireless LAN, and a combination of wired LAN and wireless LAN.

The MFP 10 includes, as shown in FIG. 1, a printer 11, a scanner 12, a facsimile device 13, a display 23, an input I/F 24, a NFC I/F 25, a Wi-Fi (registered trademark of Wi-Fi Alliance) communication I/F 26, a CPU 31, a memory 32, and a communication bus 33. The components in the MFP 10 are connected with one another through the communication bus 33.

The printer 11 may execute a recording action to record an image based on image data on a recording sheet, which may be, for example, a sheet of paper. The printer 11 may record an image on the recording sheet in a known printing method such as inkjet printing or electro-photographic printing. The scanner 12 may execute a reading action to read an image appearing on an original sheet and generate image data corresponding to the read image. It may be noted that the printer 11 and/or the scanner 12 may be optional and omitted from the system 100.

The facsimile device 13 may execute facsimile transmitting and receiving actions to exchange image data with an external device (not shown) according to a method compliant with a facsimile communication protocol. The facsimile device 13 may execute the facsimile transmitting action with use of sender information, which may indicate a sender of the image data. The sender information includes first sender information and second sender information, which will be described later in detail. The facsimile device 13 may be selectively operated between a switchable mode and a non-switchable mode. In the switchable mode, the sender information may be switched among the first sender information, the second sender information, and no exhibition of the sender information. In the non-switchable mode, the sender information may not be switched but may be fixed. While the first sender information is stored in a data storage area 32B in the MFP 10, and the second sender information may be designated outside the MFP 10, the facsimile device 13 in the switchable mode may execute a facsimile transmitting action with use of the first sender information or the second sender information designated outside the MFP 10. On the other hand, the facsimile device 13 in the non-switchable mode may execute a facsimile transmitting action, in which the sender information to be used in the facsimile transmitting action is fixed to the first sender information stored in the data storage area 32B. In the following description, a term "fax" may be used synonymously with "facsimile."

The display 23 includes a screen (not shown) to display various types of information and images concerning the MFP 10. The display 23 may include, for example, a liquid crystal display and an organic EL display.

The input I/F 24 is a user interface, through which a user's input may be entered. Specifically, the input I/F 24 may include buttons, and an operation signal corresponding to each button pressed by the user may be output to the CPU 31. The input I/F 24 may include a sheet-typed touch sensor, which may be laid over the screen of the display 23. In other words, the display 23 may serve as a touch-sensitive display. The display 23 may accept input operations to designate an object displayed on the screen and to input text including characters, signs, and numbers.

An object displayed on the screen may be an image presented to the user to be designated by the user who operates the input I/F 24. For example, an object may be a string of text, an icon, a button, and a link displayed on the display 23. The object may be designated by the user's operation to press direction keys and/or an enter key in the display 23. The object displayed on the screen of the display 23 may be, when the input I/F 24 is a touch panel, designated by the user's touch to a position where the object is displayed.

The input I/F 24 serving as a touch panel may output information of the position on the screen of the display 23 where the user touches. In this regard, the user's touch on the screen may include a behavior to cause an inputting medium to contact the screen. For example, the touching may include tapping and long-pressing, in which the inputting medium being placed to contact the screen is separated from the screen within a predetermined length of time; and swiping, flicking, pinching-in, and pinching-out, in which the input medium being placed to contact the screen is moved to slide on the screen.

Further, the touching may include placing the inputting medium to a position, which may be substantially proximate to the screen but may be spaced from the screen for a small amount. The inputting medium may include a finger of the user and a stylus pen. In the following description, a behavior to tap on a position, where an icon is displayed on the display 53, may represent the touching behavior of the user to designate the icon.

The NFC communication I/F 25 may be a communication interface configured to exchange wireless signals with an external device. That is, the MFP 10 may output various types of information to the external device including the mobile terminal 50 through the NFC communication I/F 25 and receive various types of information from the external device. A range of the wireless communication through the NFC communication I/F 25 may be smaller than a range of communication through the Wi-Fi communication I/F 26. In the following description, the wireless communication through the NFC communication I/F 25 and the wireless communication through the Wi-Fi communication I/F 26 may be referred to as NFC communication and Wi-Fi communication, respectively. A transmission speed of the NFC communication may be lower than a transmission speed of the Wi-Fi communication.

Thus, the NFC communication I/F 25 is an interface for communicating wirelessly with an external device in a close range wireless communication method which is compliant with the NFC protocol. The NFC communication I/F 25 may include an IC chip with a memory to store information which is to be exchanged with the external device. The close range wireless communication protocol may not necessarily be limited to the NFC protocol but may include, for example, TransferJet (registered trademark of TransferJet consortium).

The Wi-Fi communication I/F 26 is an interface for communication with an external device. That is, the MFP 10 may output various types of information to the external device including the mobile terminal 50 through the Wi-Fi communication I/F 26 and receives various types of information from the external device through the Wi-Fi communication I/F 26. The Wi-Fi communication I/F 26 may enable indirect wireless communication, in which the MFP 10 may wirelessly communicate with the external device through the communication network 101. Specifically, the Wi-Fi communication I/F 26 may wirelessly communicate with the external device indirectly through an intermediate relaying device, such as an access point. In the meantime, the Wi-Fi communication I/F 26 may wirelessly communicate with the external device directly without being relayed by the intermediate relaying device. In the following description, the wireless communication without being relayed by an intermediate relaying device among the Wi-Fi communication will be specifically referred to as Wi-Fi direct communication. Communication methods for the Wi-Fi communication I/F 26 with the external device may not necessarily be limited, but the Wi-Fi communication I/F 26 may employ the Wi-Fi communication for indirect wireless communication with the intermediate relaying device and the Wi-Fi direct communication for direct wireless communication.

The CPU 31 may control overall behaviors of the MFP 10. The CPU 31 may run various types of programs called from the memory 32 based on information entered through the input I/F 24 and information obtained from the external device through the NFC communication I/F 25 and through the Wi-Fi communication I/F 26. Thus, the CPU 31 in conjunction with the memory 32 may control the MFP 10.

The memory 32 includes a program storage area 32A and the data storage area 32B. The program storage area 32A may store an OS 34 and a device program 35. The device program 35 may either be a single program or an assembly of multiple programs. The data storage area 32B may store data or information which is necessary to execute the device program 35.

In the present disclosure, the terms "data" and "information" may be considered to have a common characteristic in a sense that they both may denote a bit or a string of bits that may be processed by a computer. However, data and information may be distinguished from each other by meaning(s) of content in the bit or the bit string. That is, while the bit or the bit string in the data may be processed by the computer without considering a meaning of the content thereof, behaviors of the computer may vary depending on the content of the bit or the bit string in the information.

Information may be contained in a command, which may be a controlling signal transmitted from the computer to a receiver device to cause the receiver device to act responsively to the information, or the command itself may have the characteristic of information.

While formats of data and information (e.g., text format, binary format, and flag format) may be converted among a plurality of computers, the data and the information may be handled as identical data and information as long as the contents of the data and the information before and after the conversion are maintained unchanged. For example, information indicating a quantity "two (2)" may be described as "0x32" in ASCII code in the text format to be stored in one computer and as "10" in the binary format to be stored in another computer.

Meanwhile, data and information may not necessarily be distinctively exclusive to each other but may be occasionally equated with each other. For example, data may be temporarily handled as information, and vice versa. For another example, data handled in one device may be handled as information in another device, and vice versa. For another example, information may be extracted from data, and vice versa.

The memory 32 may include a RAM, a ROM, an EEPROM, a hard-disk drive (HDD), a removable memory attachable to the MFP 10 (e.g., a USB memory), a buffer memory embedded in the CPU 31, and a combination of these.

The memory 32 may be a non-transitory computer-readable and tangible storage medium and may further include, for example, CD-ROM and DVD-ROM. In this regard, while electric signals to convey a program to be downloaded from an external device such as a server through the Internet may be a computer-readable signal medium, the electric signals are not regarded as a non-transitory computer readable storage medium.

The programs stored in the program storage area 32A may be executed by the CPU 31. Meanwhile, in the following description, actions caused by the programs, which are executed by the CPU 31, may be described without mentioning the CPU 31. For example, description "a program A executes a process B" may be interpreted as "the CPU 31 executes a process B prescribed in a program A." This implication of the CPU 31 may similarly be applied to the CPU 61 of the mobile terminal 50, which will be described later in detail.

The programs stored in the program storage area 32A may determine an event in the MFP 10 and act in response to the determination. Meanwhile, in the following description, actions caused by the programs may be described without mentioning the determination being involved. For example, description "a program executes a process A in response to a condition B" may be interpreted as "a program determines whether it is under a condition B, and, in response to an affirmative determination that the condition B is occurring, the program executes a process A." This implication concerning the determination by the programs may similarly applied to the programs to be executed by the CPU 61 of the mobile terminal 50, which will be described later in detail.

The programs stored in the program storage area 32A may designate, obtain, extract, determine, and/or select a specific unit of data. An action by the program to designate a unit of data may include, for example, specifying a unit of data which meets a specific condition among a plurality of units of data and storing the specified unit of data or information to identify the specified unit of data in a predetermined storage area. The information to identify the specified unit of data may include, for example, identification of the specified unit of data, an index of an array in which the specified unit of data is stored, and a pointer of a storage area in which the specified unit of data is stored. Actions of obtaining, extracting, determining, and selecting a unit of data may be executed in a similar manner. These actions may be similarly executed by the programs to be executed by the CPU 61 of the mobile terminal 50, which will be described later in detail.

The OS 34 is a basic program that provides an API to control hardware devices, including the printer 11, the scanner 12, the display 23, the input I/F 24, the NFC communication I/F 25, and the Wi-Fi communication I/F 26, in the MFP 10. Therefore, the programs stored in the program storage area 32A mentioned above may call the API provided by the OS 34 to control the hardware devices. In the following description, meanwhile, the actions caused by the programs may be described without mentioning the involvement of the OS 34. For example, description "a program B controls a hardware device C" may be interpreted as "a program B controls a hardware device C through the API of the OS 34." This implication of the OS 34 may similarly be applied to an OS 64 in the mobile terminal 50, which will be described later in detail.

The data storage area 32B in the memory 32 may store first sender information, which is illustrated in FIG. 2A. The first sender information may include, for example, a string of text entered by the user through the input I/F 24. The first sender information may often be entered by the user of the MFP 10 in order to indicate a sender of image data, which is to be transmitted in a fax transmitting action executed by the facsimile device 13. In the present embodiment, a string of text "So-and-so Corporation, Administration Department" is registered as the first sender information.

The data storage area 32B may further store registration information and an authentication key (see FIG. 2B). In the following description, terms "terminal information list" may denote the information stored in the data storage area 32B in the form of the registration information and the authentication key, as illustrated in FIG. 2B. Further, terms "terminal information record" may denote a set of the registration information and the authentication key which are associated with each other in the terminal information list. Thus, the terminal information list may contain a plurality of terminal information records. The authentication key(s) in the terminal information list may be referred to as registered authentication information.

The registration information is a unit of information that identifies the mobile terminal 50. The registration information may further identify the user of the mobile terminal 50. The registration information may be, for example, entered by the user of the mobile terminal 50 through the input I/F 24. The registration information may be, but not necessarily limited to, terminal ID uniquely assigned to a terminal program 65 in the mobile terminal 50. For another example, the registration information may be a telephone number assigned to the mobile terminal 50, a MAC address assigned to the Wi-Fi communication I/F 56 of the mobile terminal 50, or a string of text indicating a party to which the user of the mobile terminal 50 may belong (e.g., "So-and-so Corporation, Sales Department").

The authentication key may indicate authorization of the user that the mobile terminal 50 or the user of the mobile terminal 50 is authorized to command the MFP 10 to execute a fax transmitting action with use of the first sender information. The authentication key may be, but not necessarily be limited to, a string of numerical figures. The authentication key may be, for another example, a string of text or binary data. The authentication key may be, for example, issued by the device program 35 or, for another example, may be entered by the user of the mobile terminal 50 along with the registration information.

The data storage area 32B may, further, store a switching flag (not shown). The switching flag may contain either a first value "on," which indicates that the facsimile device 13 is in the switchable mode, or a second value "off," which represents that the facsimile device 13 is in the non-switchable mode. The value in the switching flag may be set by a manufacturer of the MFP 10 prior to shipping, by the user through the input I/F 24, or may be set from the mobile terminal 50 through the Wi-Fi communication I/F 26.

The mobile terminal 50 includes, as shown in FIG. 1, a display 53, an input I/F 54, an NFC communication I/F 55, a Wi-Fi communication I/F 56, a CPU 61, a memory 62, and a communication bus 63. The display 53, the input I/F 54, the NFC communication I/F 55, the Wi-Fi communication I/F 56, the CPU 61, the memory 62, and the communication bus 63 are in configurations similar to the display 23, the input I/F 24, the NFC communication I/F 25, the Wi-Fi communication if 26, the CPU 31, the memory 32, and the communication bus 33, respectively, in the MFP 10; therefore, detailed explanation of these will be omitted.

The mobile terminal 50 may include, for example, a cellular phone, a smartphone, and a tablet. The CPU 61 in conjunction with the memory 62 may control behaviors of the mobile terminal 50.

The program storage area 62A in the memory 62 may store the OS 64 and the terminal program 65. The OS 64 may include, but not be limited to, Android (registered trademark of Google, Inc.) OS, iOS (registered trademark of Cisco Systems, Inc.), and Windows Phone (registered trademark of Microsoft Corporation) OS.

The data storage area 62B in the memory 62 may store the second sender information, which is illustrated in FIG. 2C. The second sender information may include, for example, a string of text entered by the user through the input I/F 54. The second sender information may often be entered by the user of the mobile terminal 50 in order to indicate a sender of image data, which is to be transmitted in a fax transmitting action executed by the facsimile device 13. In the present embodiment, a string of text "So-and-so Corporation, Sales Department" is registered as the second sender information.

The data storage area 32B may further store device ID and an authentication key associated with the device ID (see FIG. 2D). In the following description, terms "device information list" may denote the information stored in the data storage area 32B in the form of the device ID and the authentication key, as illustrated in FIG. 2D. Further, terms "device information record" may denote a set of the device ID and the authentication key which are associated with each other in the device information list. Thus, the device information list may contain a plurality of device information records.

The device ID is a unit of information that identifies the MFP 10. The authentication key is obtained from the MFP 10, which is identified by the device ID associated with the authentication key. In other words, the identical authentication key is registered with both the MFP 10 and the mobile terminal 50. The data storage area 62B may, further, include data folders (not shown) to store, for example, photo data, document data, presentation data, and spreadsheet data.

Next, actions in processes to be executed in the system 100 according to the embodiment of the present disclosure will be described with reference to FIGS. 3-7.

Figure 3:
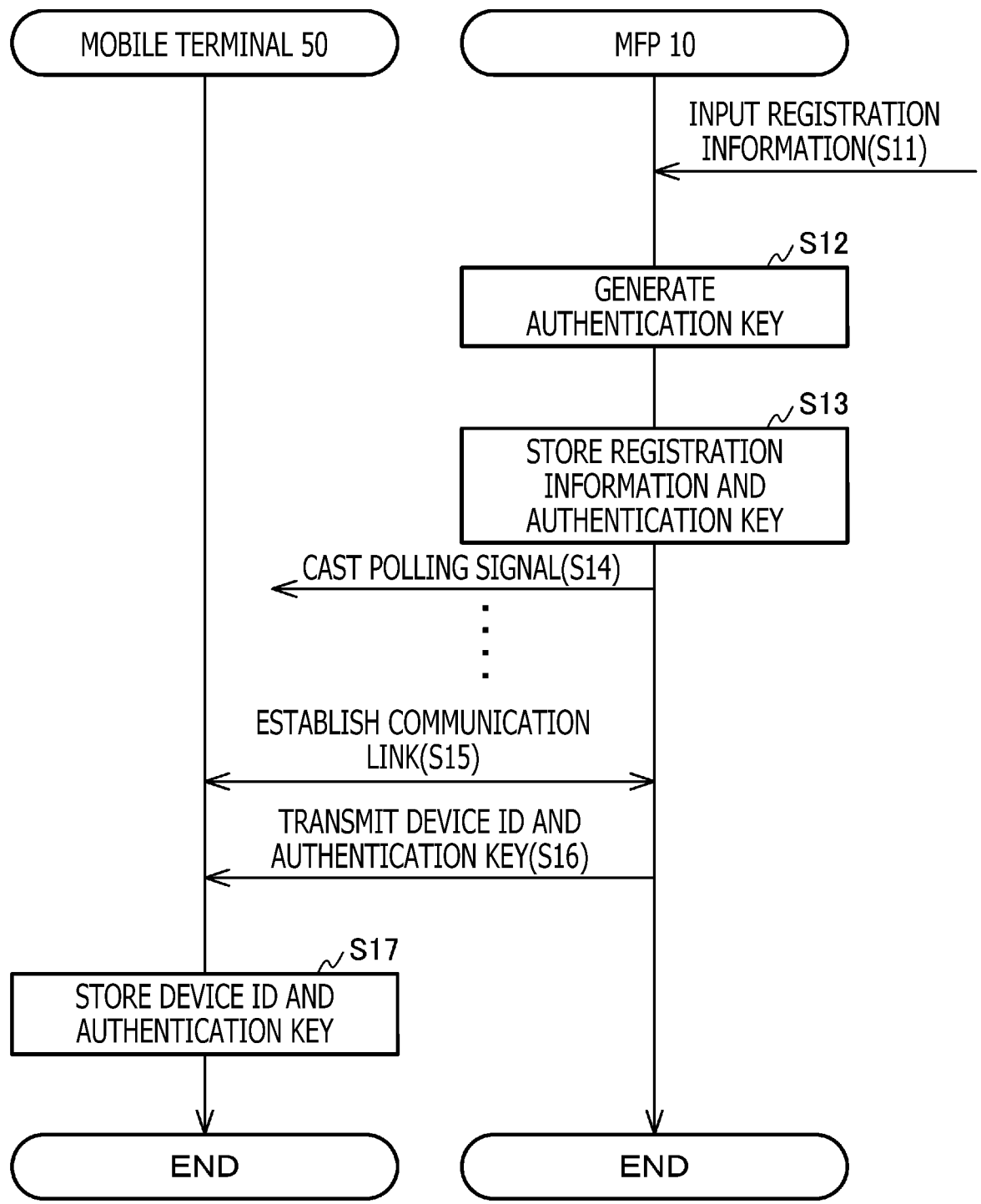
FIG. 3 is a flowchart showing a flow of steps in a registration process to be executed in the mobile terminal according to the illustrative embodiment of the present disclosure.

The processes include a registration process, which will be described below with reference to FIG. 3. In the registration process, the mobile terminal 50 is registered with the MFP 10 so that the mobile terminal 50 may be enabled to command the MFP 10 to execute the fax transmitting action with use of the first sender information.

In the registration process, in S11, the device program 35 in the MFP 10 accepts an operation to input a terminal ID "Term-A" of the mobile terminal 50 through the input I/F 24. Alternatively, the device program 35 may receive the terminal ID from the mobile terminal 50 through the NFC communication I/F 25 or the Wi-Fi communication I/F 26. Next, in S12, the device program 35 generates an authentication key "1234." In S13, the device program 35 stores a terminal information record containing the terminal ID "Term-A" input in Si 1 and the authentication key "1234" generated in S12 in the terminal information list. In the terminal information record, the terminal ID "Term-A" and the authentication key "1234" are associated with each other.

In S14, the device program 35 casts polling signals through the NFC communication I/F 25 periodically. The device program 35 may receive a responsive signal, which is transmitted in response to one of the polling signals, from the mobile terminal 50 located in the NFC communication range of the MFP 10. In response to receiving the responsive signal, in S15, the device program 35 establishes a communication link with the mobile terminal 50 following the NFC protocol. In S16, the device program 35 transmits a device ID "MFP-A" and the authentication key "1234" generated in S12 to the mobile terminal 50.

Further, in S16, the terminal program 65 in the mobile terminal 50 receives the device ID "MFP-A" and the authentication key "1234" transmitted from the MFP 10 through the NFC communication I/F 55 over the communication link established with the NFC communication I/F 25. In S17, the terminal program 65 stores a device information record containing the device ID "MFP-A" and the authentication key "1234" received in S16 in the device information list.

Next, a fax instruction process to be executed by the mobile terminal 50 will be described with reference to FIG. 4. In the fax instruction process, the mobile terminal 50 may command the MFP 10 to execute a fax transmitting action. Meanwhile, the MFP 10 may execute a reply process and a fax transmission process. The reply process and the fax transmission process will be described later with reference to FIGS. 6 and 7, respectively.

Figure 8B:
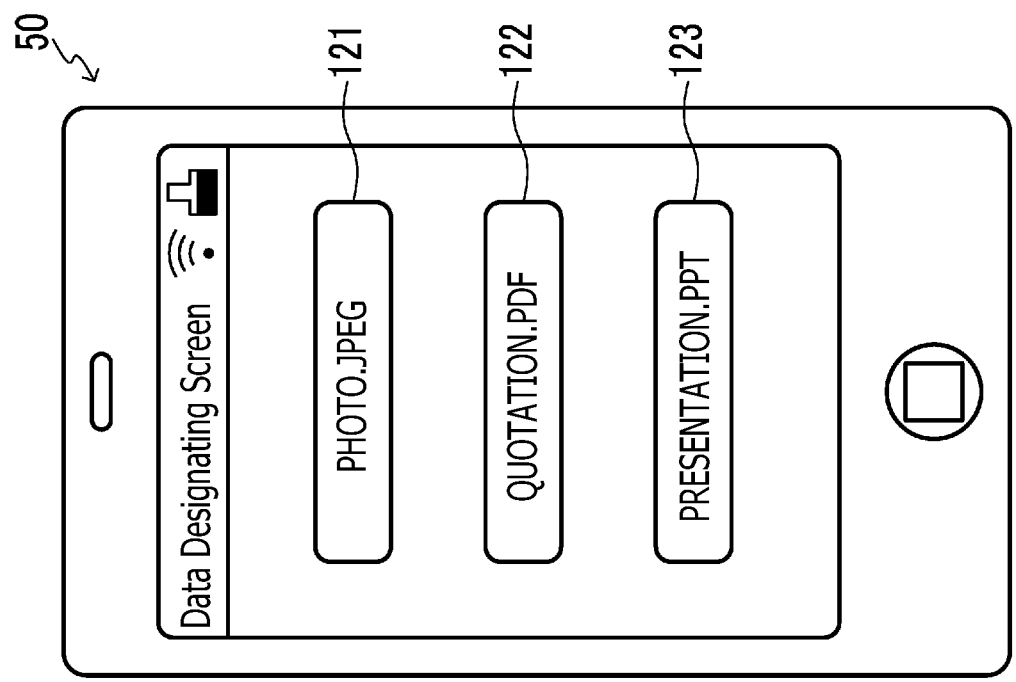
FIG. 8B is an illustrative view of a data designating screen in the display of the mobile terminal according to the embodiment of the present disclosure.
Figure 8A:
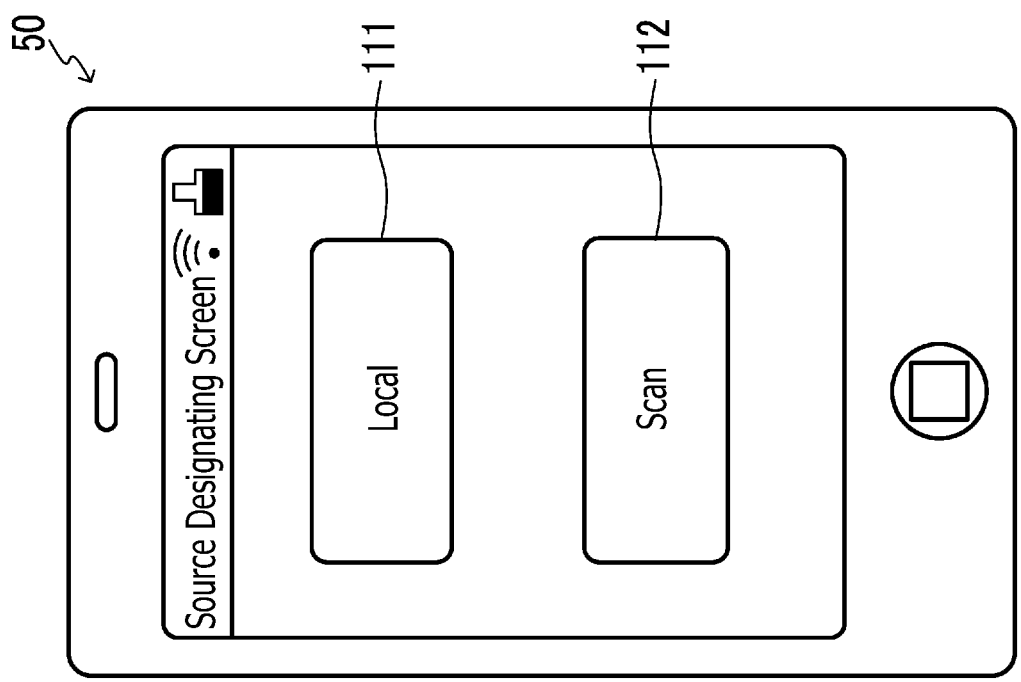
FIG. 8A is an illustrative view of a source designating screen in a display of the mobile terminal according to the embodiment of the present disclosure.

In the fax instruction process, in S21, the terminal program 65 in the mobile terminal 50 controls the display 53 to display a source designating screen (see FIG. 8A). The source designating screen illustrated in FIG. 8A includes a [Local] icon 111 and a [Scan] icon 112. The [Local] icon 111 may correspond to a command that causes the facsimile device 13 to transmit image data stored in the data storage area 62B or a server (not shown) on the Internet. The [Scan] icon 112 may correspond to a command that causes the scanner 12 to execute a reading action to read an image and the facsimile device 13 to transmit image data which was generated in the reading action. In S22, the terminal program 65 may receive designating input to designate one of the options between the [Local] icon 111 and the [Scan] icon 112 by the user to the source designating screen through the input I/F 54. In other words, the user may designate one of the [Local] icon 111 and the [Scan] icon 112 through the source designating screen, and the designation may be entered through the input I/F 54.

In response to receiving designation of the [Local] icon 111 in S22 (S22: [Local]), in S23, the terminal program 65 controls the display 53 to display a data designating screen (see FIG. 8B). The data designating screen illustrated in FIG. 8B may include a plurality of data icons 121, 122, 123, which each corresponds to a unit of data stored in, for example, a data folder in the data storage area 62B or a server (not shown) on the Internet. In S24, the terminal program 65 may receive designating input to designate one of the options by the user to the data designating screen through the input I/F 54. In other words, the user may designate one of the image data units through the data designating screen, and the designation may be entered through the input I/F 54.

When the data icon 121 is designated through the input I/F, that is, in response to receiving designation of the data icon 121 through the input I/F 54 (S24: YES), the terminal program 65 determines the data unit named "PHOTO. JPEG" corresponding to the data icon 121 to be fax data. For example, the terminal program 65 may temporarily store the data ID of the designated data unit, e.g., "PHOTO.JPEG" in the data storage area 62B. The fax data may be image data, which is a transmission object of the fax transmitting action by the MFP 10.

In S25, the terminal program 65 transmits inquiry information to the MFP 10 through the Wi-Fi communication I/F 56. The inquiry information is a unit of information to inquire of the MFP 10 whether the sender information, which may be used in the fax transmitting action, is switchable or not. In other words, the inquiry information may be information to determine the mode of the facsimile device 13 between the switchable mode and the non-switchable mode.

Figure 6:
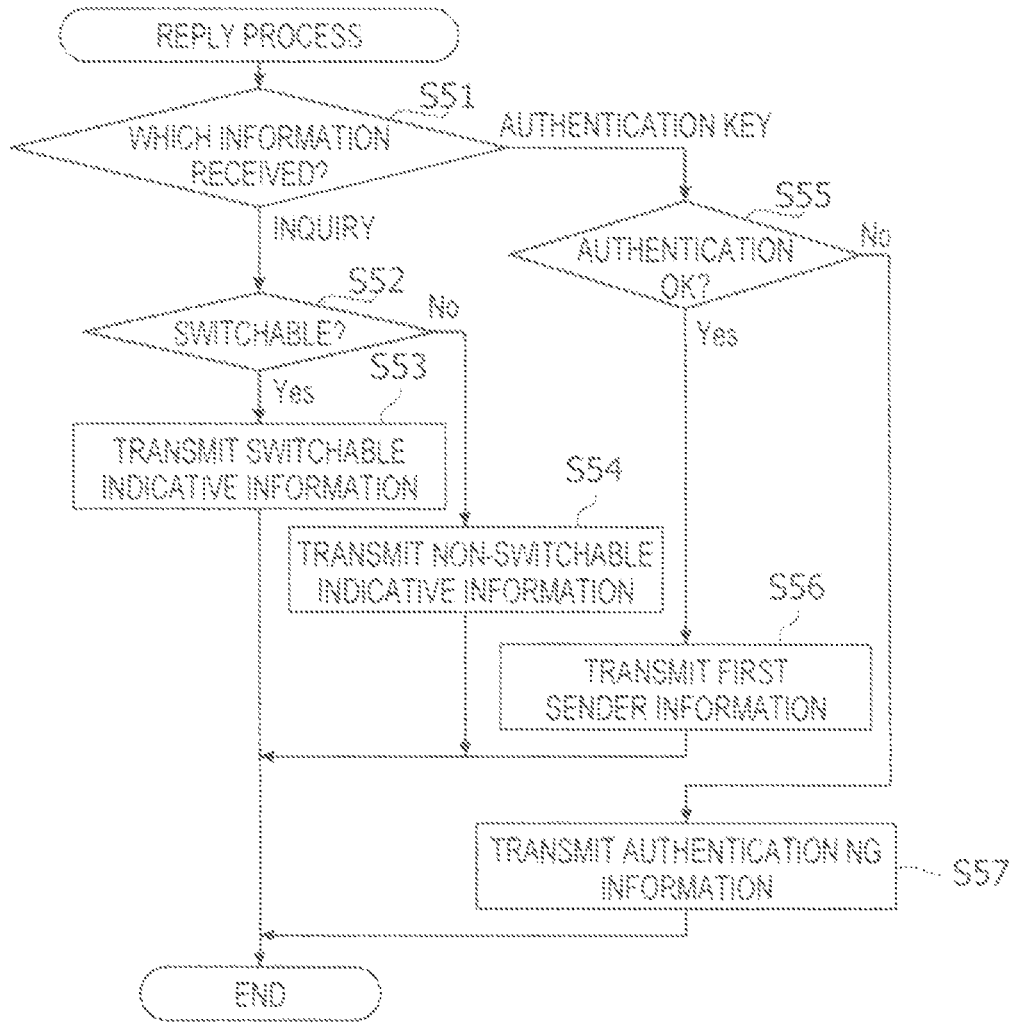
FIG. 6 is a flowchart showing a flow of steps in a reply process to be executed in the MFP according to the illustrative embodiment of the present disclosure.

In the meantime, the reply process shown in FIG. 6 is executed in the MFP 10. As shown in FIG. 6, in S51, the device program 35 in the MFP 10 may receive the inquiry information from the mobile terminal 50 through the Wi-Fi communication I/F 26 in S51. In S52, the device program 35 determines the switchable/non-switchable mode of the facsimile device 13 based on a value set in the switching flag stored in the data storage area 32B. When the facsimile device 13 is in the switchable mode, that is, in S52, in response to determination that the facsimile device 13 is in the switchable mode (S52: YES), in S53, the device program 35 transmits switchable-indicative information to the mobile terminal 50 through the Wi-Fi communication I/F 26. The switchable-indicative information may indicate that the facsimile device 13 is in the switchable mode. In other words, the switchable-indicative information indicates that the switchable flag is "on."

On the other hand, in S52, in response to determination that the facsimile device 13 is in the non-switchable mode (S52: NO), in S54, the device program 35 transmits non-switchable indicative information to the mobile terminal 50 through the Wi-Fi communication I/F 26. The non-switchable indicative information may indicate that the facsimile device 13 is in the non-switchable mode. In other words, the non-switchable indicative information indicates that the switchable flag is "off".

Figure 4:
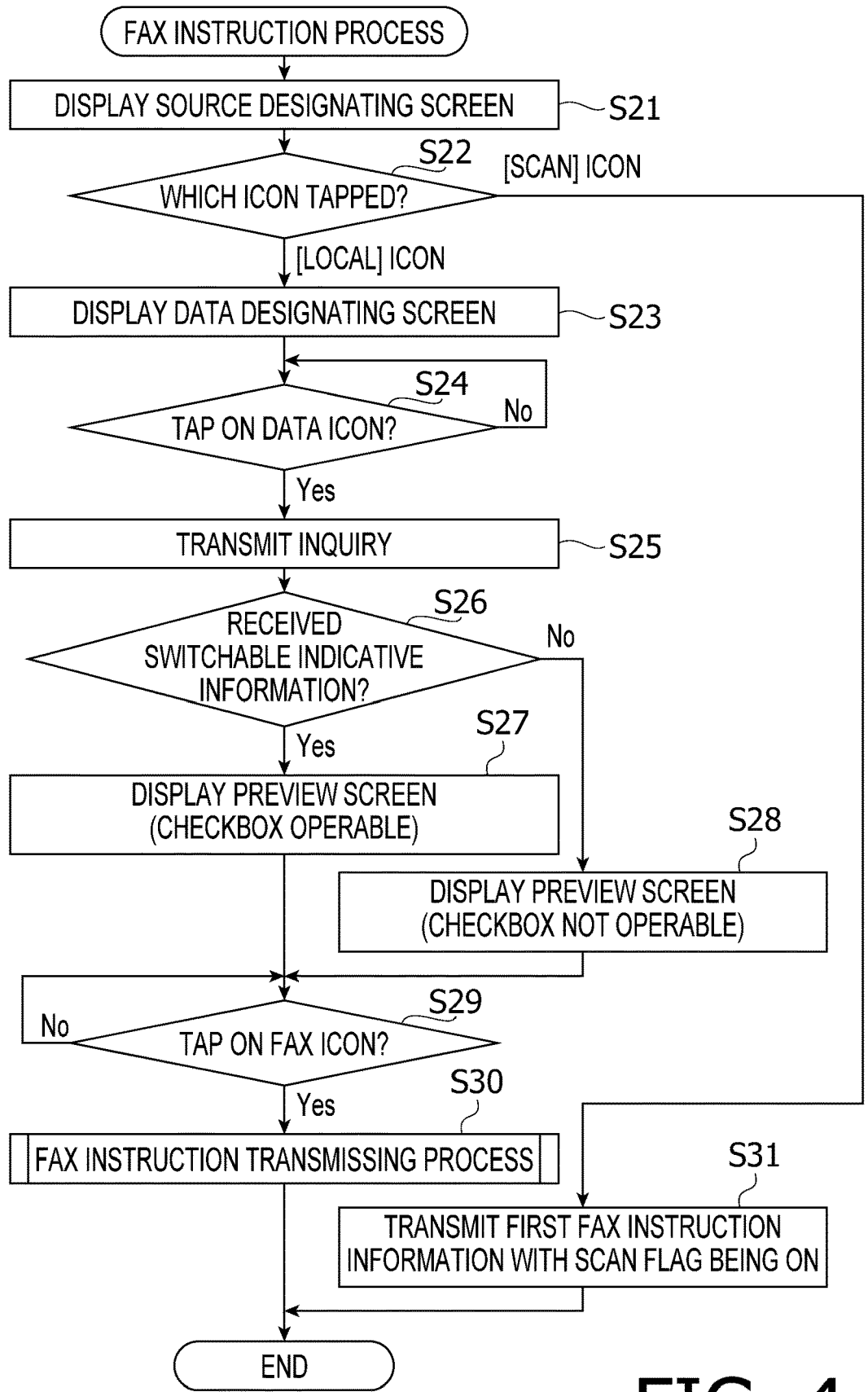
FIG. 4 is a flowchart showing a flow of steps in a fax instruction process to be executed in the MFP according to the illustrative embodiment of the present disclosure.

In the meantime, as shown in FIG. 4, in S26, the terminal program 65 in the mobile terminal 50 may receive the switchable-indicative information or the non-switchable indicative information as a reply to the inquiry information transmitted in S25. In this regard, there may be a case that the terminal program 65 transmits the inquiry information to a facsimile device, which is not capable of switching the sender information; in other words, the terminal program 65 may transmit the inquiry information to a facsimile device which always uses the first sender information for a fax transmitting action. Therefore, the terminal program 65 may not receive a reply from the facsimile device after transmitting the inquiry information in S25 and waiting for the reply for a predetermined length of time. In such a case, the terminal program 65 may handle the situation as if the terminal program 65 received the non-switchable indicative information. In other words, the terminal program 65 may determine that the facsimile device is in the non-switchable mode.

In response to receiving the switchable-indicative information in S26 (S26: YES), in S27, the terminal program 65 controls the display 53 to display a preview screen (see FIG. 9A). On the other hand, in response to receiving the non-switchable indicative information in S26 (S26: NO), in S28, the terminal program 65 controls the display 53 to display another preview screen (see FIG. 9B). In S29, the terminal program 65 accepts an input operation from the user to the preview screen through the input I/F 54.

The preview screen shown in FIG. 9A, which is displayed in response to receipt of the switchable-indicative information in S26, includes a preview image 131, a checkbox 132, and a [FAX] icon 133. The preview image 131 is an image corresponding to the designated fax data "PHOTO.JPEG," which is to be received by the facsimile device 13 in a receiving action and may be output by the facsimile device 13, so that the image may be viewed by the user prior to the transmission from the mobile terminal 50. The checkbox 132 corresponds to an instruction to obtain the first sender information from the MFP 10. The [FAX] icon 133 corresponds to an instruction to manipulate the MFP 10 to activate the fax transmitting action.

The preview screen shown in FIG. 9B, which is displayed in response to receipt of the non-switchable indicative information in S26, may be identical to the preview screen shown in FIG. 9A except that the checkbox 132 is not operable to the user. In other words, in response to receipt of the switchable-indicative information from the MFP 10 (S26: YES), in S27, the terminal program 65 controls the display 53 to display the preview screen which contains the operable checkbox 132. On the other hand, in response to receipt of the non-switchable indicative information from the MFP 10 (S26: NO), in S28, the terminal program 65 controls the display 53 to display the preview screen which contains the non-operable checkbox 132. The user viewing the preview screen (FIG. 9A or 9B) may or may not place a checkmark in the 132 and tap on the [FAX] icon 133 to designate the [FAX] icon 133 through the input I/F 54.

In S29, in response to designation of the [FAX] icon 133 through the input I/F 54 (S29 YES), in S30, the terminal program 65 activates a fax instruction transmitting process. In the fax instruction transmitting process, the terminal program 65 may determine sender information to be used in the facsimile transmission and transmit fax instruction information to the MFP 10.

Figure 5:
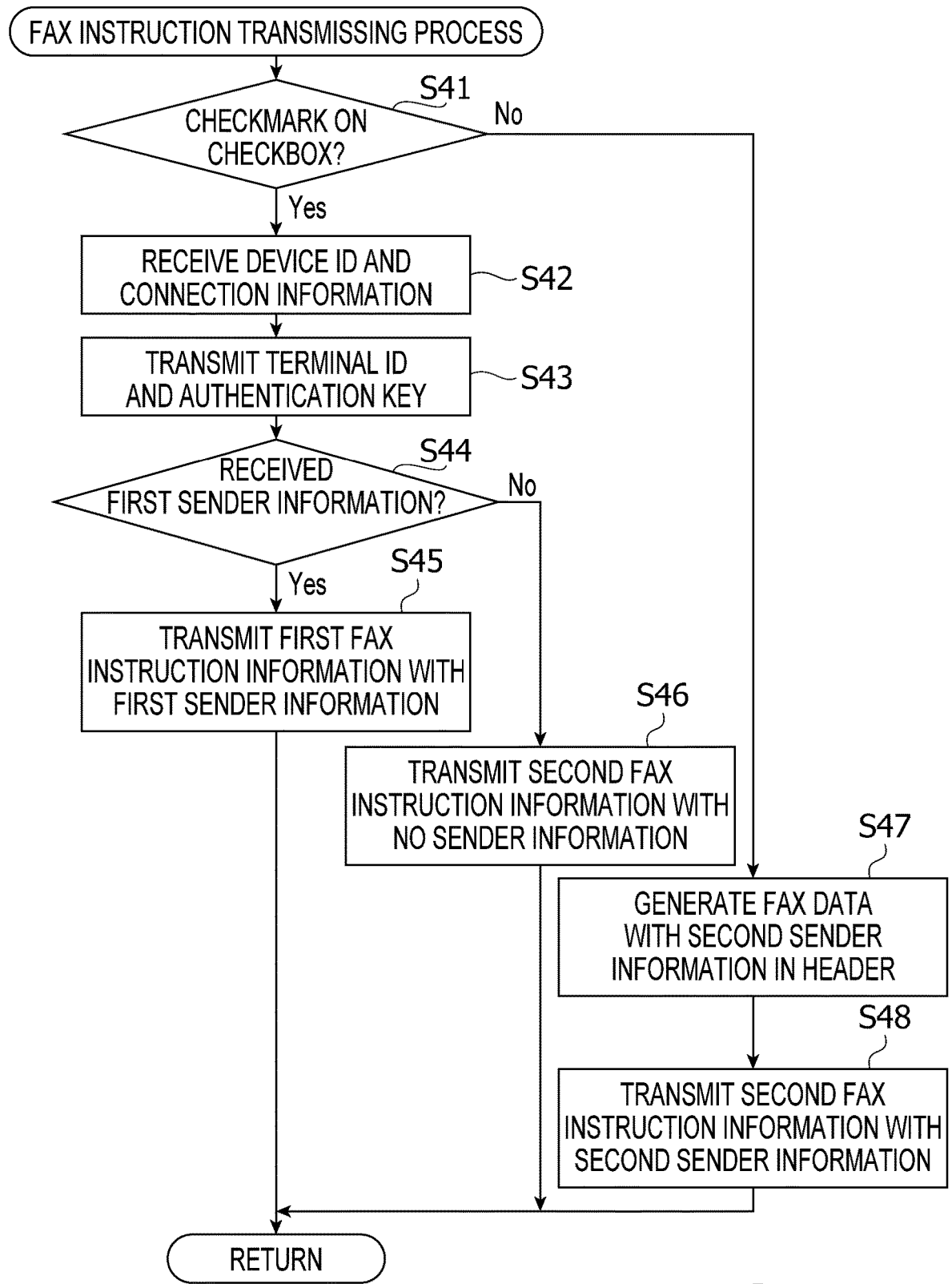
FIG. 5 is a flowchart showing a flow of steps in a fax instruction transmitting process to be executed in the MFP according to the illustrative embodiment of the present disclosure.

The fax instruction transmitting process will be described with reference to FIG. 5. In the fax instruction transmitting process, in S41, the terminal program 65 determines whether the [FAX] icon 133 is designated while the checkmark is placed in the checkbox 132. The operation to designate the [FAX] icon 133 after placing a checkmark in the checkbox 132 may be hereinafter referred to as a first instructing operation. Meanwhile, an operation to designate the [FAX]

icon 133 without placing a checkmark in the checkbox 132 may be hereinafter referred to as a second instructing operation.

In response to receiving the first instructing operation (S41: YES), in S42, the terminal program 65 obtains the device ID "MFP-A" and connection information from the MFP 10 through the NFC communication I/F 55. The connection information is a unit of information required for the mobile terminal 50 to establish the Wi-Fi direct connection with the MFP 10. The connection information may include, for example, an IP address, a MAC address, and an SSID. The communication link through the NFC communication I/F 55 may be established through a procedure which may include steps similar to S14, S15.

The terminal program 65 may establish the Wi-Fi direct connection between the Wi-Fi communication I/F 56 and the Wi-Fi communication I/F 26 in the MFP 10 based on the connection information received in S42. Further, the terminal program 65 may read the authentication key "1234" associated with the device ID "MFP-A" which was received in S42 from the device information list. In S43, the terminal program 65 transmits the terminal ID "Term-A" of the mobile terminal 50 and the authentication key "1234" to the MFP 10 through the Wi-Fi communication I/F 56.

Meanwhile, the device program 35 in the MFP 10 running the replay process shown in FIG. 6 receives in S51 the terminal ID "Term-A" and the authentication key "1234" transmitted from the mobile terminal 50 in S43 through the Wi-Fi direct connection with the Wi-Fi communication I/F 26 (S51: authentication key). The authentication key transmitted in S43 and received in S51 may be referred to as transmitted authentication information. In S55, the device program 35 determines whether the terminal information record, which includes the terminal ID and the authentication key received in S51, is contained in the terminal information list. In other words, the device program 35 determines whether the transmitted authentication information is identical with the registered authentication information.

In S55, in response to determination that the transmitted authentication information is identical with the registered authentication information (S55: YES), in S56, the device program 35 transmits the first sender information, which is the text "So-and-so Corporation, Administration Department," stored in the data storage area 32B to the mobile terminal 50 through the Wi-Fi direct connection with the Wi-Fi communication I/F 26. On the other hand, in S55, in response to determination that the transmitted authentication information is not identical with the registered authentication information (S55: NO), in S57, the device program 35 transmits no-authentication information to the mobile terminal 50 through the Wi-Fi direct connection with the Wi-Fi communication I/F 26. The no-authentication information may indicate that the mobile terminal 50 is not authorized to command the MFP 10 to execute the fax transmitting action with use of the first sender information.

Meanwhile, the terminal program 65 in the mobile terminal 50 running the fax instruction transmitting process (see FIG. 5) receives the first sender information or the no-authentication information transmitted from the MFP 10 in S56 or S57 through the Wi-Fi communication I/F 56 over the Wi-Fi direct connection, in S44. In response to receiving the first sender information (S44: YES), in S45, the terminal program 65 transmits first fax instruction information to the MFP 10 through the Wi-Fi communication I/F 56 over the Wi-Fi direct connection. On the other hand, in response to receiving the no-authentication information from the MFP 10 (S44: NO), in S46, the terminal program 65 transmits second fax instruction information to the MFP 10 through the Wi-Fi communication I/F 56 over the Wi-Fi direct connection.

The first fax instruction information may include information to command the MFP 10 to execute a fax transmitting action with use of the first sender information. The first fax instruction information may include, for example, the fax data named "PHOTO.JPEG" designated in S24 and the first sender information "So-and-so Corporation, Administration Department" received from the MFP 10 in S44. The second fax instruction information may include information to command the MFP 10 to execute a fax transmitting action without using the first sender information and with or without using the second sender information. In particular, the second fax instruction information to be transmitted in S46 may include, for example, the fax data named "PHOTO.JPEG" designated in S24 but does not include the first or second sender information.

The terminal program 65 in the mobile terminal 50 may accept an input operation from the user to enter destination information (e.g., a fax number), which is information to identify an external device being a destination of the fax transmitting action, through the input I/F 54 and append the entered destination information to the first fax instruction information or the second fax instruction information. Further, the terminal program 65 may add the terminal ID "Term-A" of the mobile terminal 50 to the first fax instruction information or the second fax instruction information. Illustration of these steps are omitted.

In the meantime, S41, the terminal program 65 may receive the second instructing operation to designate the [FAX] icon 133 without placing a checkmark in the checkbox 132. In response to receiving the second instructing operation (S41: NO), in S47, the terminal program 65 combines an image indicating the second sender information with the fax data. For example, the terminal program 65 may generate combined fax data by adding a fax header containing an image that exhibits the second sender information "So-and-so Corporation, Sales Department" to an upper side of an image exhibiting the fax data named "PHOTO.JPEG" In S48, the terminal program 65 transmits the second fax instruction information to the MFP 10 through the Wi-Fi communication I/F 56 over the Wi-Fi direct connection.

The second fax instruction information may include information to command the MFP 10 to execute a fax transmitting action with or without using the second sender information. In particular, the second fax instruction information to be transmitted in S48 may include the fax data named "PHOTO.JPEG" generated in S47 and the second sender information "So-and-so Corporation, Sales Department" stored in the data storage area 62B. In other words, the second fax instruction information to be transmitted in S46 and the second fax instruction information to be transmitted in S48 may be the same in a sense that the terminal program 65 commands the MFP 10 to execute the fax transmitting action without using the first sender information. Meanwhile, the second fax instruction information to be transmitted in S46 and the second fax instruction information to be transmitted in S48 are different from each other in terms of absence or presence of the second sender information.

Referring back to the fax instruction process in FIG. 4, in S22, the terminal program 65 may receive designating input to designate the [Scan] icon 112 by the user, i.e., the first instructing operation, to the source designating screen through the input I/F 54. In response to receiving designation of the [Scan] icon 112 through the input I/F 54 (S22:

[Scan]), in S31, the terminal program 65 transmits the first fax instruction information to the MFP 10 through the Wi-Fi communication I/F 56. The first fax instruction information to be transmitted in S31 may include indication of a scan flag being "on" but does not include the fax data or the sender information. The action in S31 may likewise be executed in response to designation of the [Local] icon 111 in S22. Further, the actions in S23-S30 may be executed in response to the designation of the [Scan] icon 112.

The scan flag being "on" may correspond to a command, which may manipulate the scanner 12 in the MFP 10 to read an image of an original sheet and generate image data to be handled in the fax transmitting action. In other words, the first or second fax instruction information to be transmitted in S45, S46, and S48 may include a scan flag being "off," or may not include a scan flag at all. The first fax instruction information transmitted in S31 and the first fax instruction information transmitted in S45 may be the same in a sense that the first fax instruction information may command the MFP 10 to execute the fax transmitting action with use of the first sender information. However, the first fax instruction information to be transmitted in S31 and the first fax instruction information to be transmitted in S45 are different from each other in terms of presence or absence of the scan flag being "on," absence or presence of the fax data, and absence or presence of the first sender information, respectively.

Figure 7:
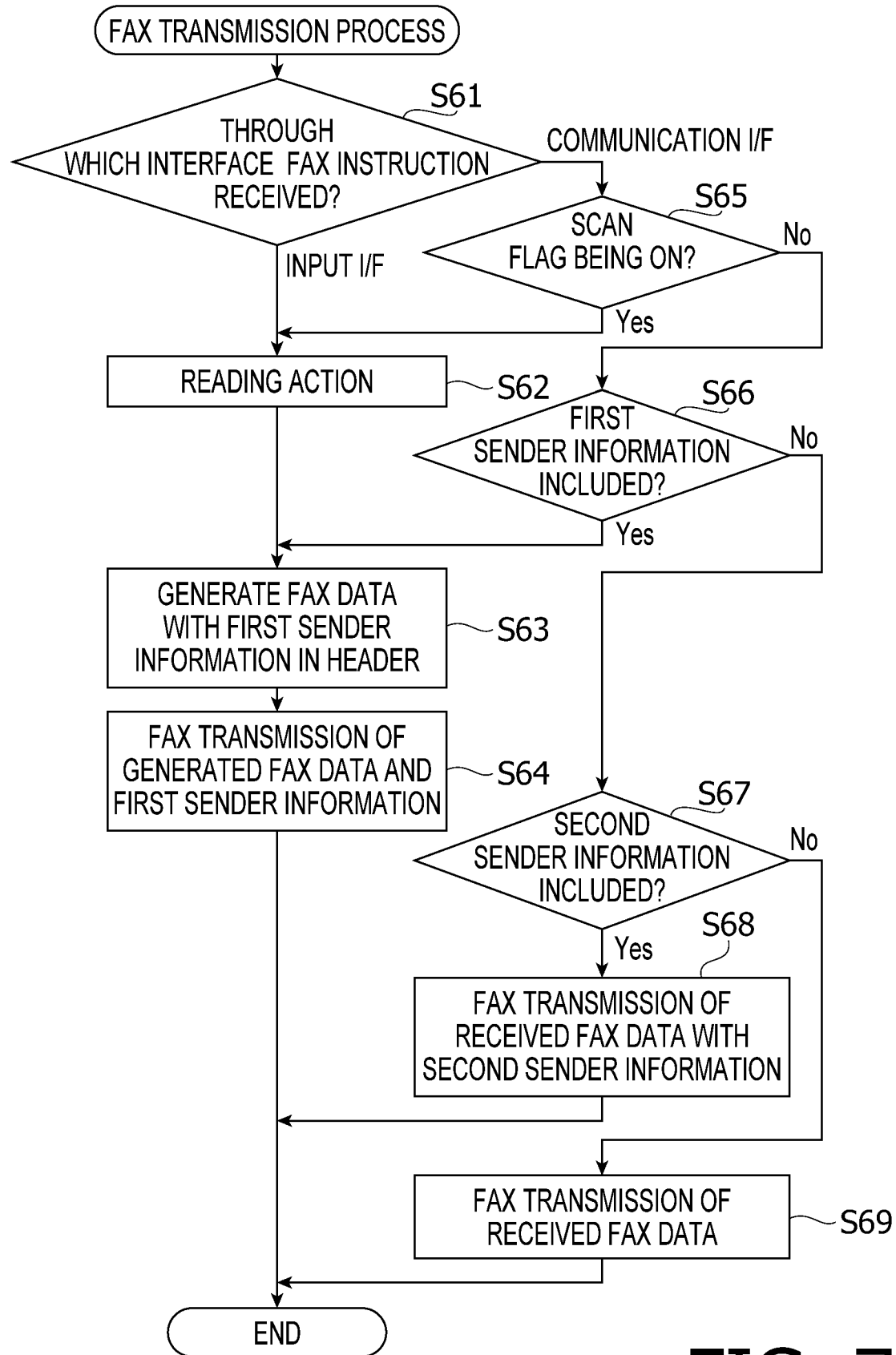
FIG. 7 is a flowchart showing a flow of steps in a fax transmission process to be executed in the MFP according to the illustrative embodiment of the present disclosure.

In the meantime, the device program 35 may accept an instructing operation in a fax transmission process shown in FIG. 7. Specifically, in S61, the device program 35 may receive the instructing operation through the input I/F 24 (S61: input I/F). The instructing operation may correspond to a command, which may manipulate the scanner 12 in the MFP 10 to read an image and generate fax data, and manipulate the facsimile device 13 to transmit the generated fax data with use of the first sender information. In S61, the device program 35 may accept destination information (e.g., a fax number), which is information to identify an external device being a destination of the fax transmitting action, through the input I/F 24.

In S62, the device program 35 controls the scanner 12 to execute a reading action. In the reading action, the scanner 12 may read an image of an original sheet, which is set on a contact glass (not shown) or in an auto document feeder (ADF) (not shown) and generate fax data containing the image. In S63, the device program 35 combines an image exhibiting the first sender information with the fax data generated in S62. For example, the device program 35 may generate combined fax data by appending a fax header containing an image that exhibits the first sender information "So-and-so Corporation, Administration Department" to an upper side of the image that exhibits the fax data generated in S62.

In S64, the terminal program 35 controls the facsimile device 13 to execute the fax transmitting action with use of the fax data generated in S63 and the first sender information stored in the data storage area 32B. Specifically, the facsimile device 13 may establish connection with the external device identified by the sender information, transmit a controlling command with the first sender information as a parameter to the external device, transmit the fax data to the external device, and terminate the connection with the external device.

In S61, on the other hand, the device program 65 may receive the first fax instruction information or the second fax instruction information from the mobile terminal 50 through the Wi-Fi communication I/F 26 over the Wi-Fi direct connection (S61: communication interface). In S65, S66, or S67, the device program 35 determines whether the received fax instruction information includes the scan flag being "on," the first sender information, or the second sender information, respectively.

Meanwhile, in S65, the first or second fax instruction information received from the mobile terminal 50 may not include the scan flag being "on." In response to negative determination that the received first or second fax instruction information includes the scan flag being "on" (S65: NO), and, in S66, in response to determination that the received first or second fax instruction information contains the first sender information (S66: YES), the device program 35 executes S63 and S64, which may be executed in the manners described above. In this regard, however, in S63, the device program 35 may combine an image exhibiting the first sender information contained in the first fax instruction information with the fax data contained in the first fax instruction information. Further, in S64, the device program 35 may control the facsimile device 13 to execute the fax transmitting action with use of the first sender information contained in the first fax instruction information. In the affirmative determination in S66, it may be determined that the received first or second fax instruction information is first fax instruction information.

In S66, in response to negative determination that the received first or second fax instruction information contains the first sender information (S66: NO), it may be determined that the received first or second fax instruction information is second fax instruction information. In S67, in response to determination that the received second fax instruction information contains the second sender information (S67: YES), in S68, the device program 35 controls the facsimile device 13 to execute the fax transmitting action with use of the destination information, the second sender information, and the fax data contained in the second fax instruction information. The fax transmitting action in S68 by the facsimile device 13 may be executed in the similar manner to S64.

In S67, the device program 35 may determine that the received second fax instruction information does not contain second sender information (S67: NO). In response to the negative determination in S67 (S67: NO), in S69, the device program 35 controls the facsimile device 13 to execute the fax transmitting action with use of the fax data contained in the second fax instruction information. The fax transmitting action in S69 by the facsimile device 13 may be executed in the similar manner to S64. In this regard, however, no sender information is included in a control command transmitted by the facsimile device 13 to the external device.

According to the embodiment described above, the mobile terminal 50 that obtained the first sender information as a reply to the authentication key, that is, the mobile terminal 50 alone authorized by the MFP 10 may manipulate the MFP 10 to execute the fax transmitting action with use of the first sender information, which may be related to the MFP 10. Therefore, for example, a fax transmitting action with use of the first sender information by a user of a mobile terminal 50, which does not belong to a sender organization that may be identified by the first sender information, may be prevented. In other words, a fax transmitting action with appropriate use of sender information may be executed.

According to the embodiment described above, further, the user may select to use or not to use the first sender information for the fax transmitting action from the mobile terminal 50. Therefore, for example, when a user of the mobile terminal 50 happens to use a facsimile device, which is a different machine from a usually-used facsimile device, the sender information indicating a sender organization which is different from the user's organization may be prevented from being used for the fax transmitting action. In other words, facsimile transmission with appropriate use of the sender information may be executed.

According to the embodiment described above, the authentication key may be transmitted from the MFP 10 to the mobile terminal 50 over the NFC communication. In order to receive the authentication key, the user of the mobile terminal 50 may be required to stand in a close range from the MFP 10. Accordingly, the authentication key may be prevented from being maliciously obtained by another distant user. Further, the mobile terminal 50 may be connected with the MFP 10 through the Wi-Fi direct connection with use of the connection information obtained through the NFC communication, and the fax instruction information may be transmitted from the mobile terminal 50 to the MFP 10 through the Wi-Fi direct communication. Therefore, the fax transmitting action from the mobile terminal 50 through the MFP 10 is allowed to the user who carries the mobile terminal 50 substantially close to the MFP 10. Thus, remote and malicious facsimile transmission using an unauthorized mobile terminal 50 may be restricted.

It may be noted that the methods of the communication between the MFP 10 and the mobile terminal 50 in S16, S25, S26, S31, S42-S46, S48, S51, S53, S54, S56, S57, and S61 may not necessarily be limited to those described above. For example, the methods may not necessarily be varied but may be unified into one of the NFC communication, the Wi-Fi communication, and the Wi-Fi direct communication. In this regard, however, it may be preferable that the communication in S16, which should be more secured than the communication in the other steps, employs the NFC communication. Meanwhile, for the communication in S31, S45, S46, S48, in which a larger volume of information may be exchanged, the Wi-Fi communication or the Wi-Fi direct communication may be preferable.

Meanwhile, the second fax instruction information transmitted in S46 may not necessarily be limited to a command for the fax transmitting action, in which neither the first sender information nor the second sender information is used, but may be a command for a fax transmitting action in which the second sender information is used. Similarly, the second fax instruction information to be transmitted in S48 may not necessarily be limited to a command for the fax transmitting action, in which the second sender information is used, but may be a command for a fax transmitting action, in which neither the first sender information nor the second sender information is used.

According to the embodiment described above, the control command with the sender information as the parameter is transmitted from the facsimile device 13 to the external device; therefore, the external device being the receiver of the control command may process (e.g., sort) the fax data based on the received sender information. Further, while the image to exhibit the sender information may be appended to the fax data as a header, a user of a destination external device may recognize the sender of the fax data by the sender information in the header. Meanwhile, the process to combine the image to exhibit the sender information with the fax data may be executed in either the MFP 10 or the mobile terminal 50.

The sender information contained in the fax instruction information may be used solely in one of the step, in which the sender information is used as the parameter for the control command, and the step, in which the sender information appended as the header to the fax data is transmitted.

In other words, the facsimile device 13 may not necessarily append the sender information contained in the fax instruction information to the control command but may append to the fax data. Alternately, the facsimile device 13 may not necessarily append the sender information contained in the fax instruction information to the fax data but may append to the control command.

Further, the sender information to be appended to the control command and the sender information to be appended to the fax data may not necessarily be obtained from a same source but may be obtained from different sources. That is, the facsimile device 13 may append the sender information contained in the fax instruction information to one of the control command and the fax data, and may append the first sender information stored in the data storage area 32B to the other of the control command and the fax data. Furthermore, the data storage area 32B may store a first switchable-indicative flag, which may indicate whether the sender information to be appended to the control command is switchable, and a second switchable-indicative flag, which may indicate the sender information to be appended to the fax data is switchable. The device program 35 may select the sender information to be used in each process based on the values set in the first and second switchable-indicative flags.

For example, the device program 35 in the MFP 10 may execute a process corresponding to S47 immediately before S68. In this regard, the second fax instruction information may be used to generate the combined image data, in which the image to exhibit the second sender information is appended to the fax data, and to execute the fax transmitting action with the generated combined image data. For another example, the terminal program 65 in the mobile terminal 50 may execute the process corresponding to S63 immediately before S45. In this regard, the first fax instruction information may include the combined image data, in which the image to exhibit the first sender information is appended to the fax data, and to execute the fax transmitting action with the generated combined image data.

For another example, information equivalent to the switchable-indicative flag may be stored in the data storage area 62B in the mobile terminal 50. The switchable-indicative flag to be stored in the data storage area 62B may indicate, for example, a first value "on," which may allow a user to designate the sender information to be appended to the fax instruction information, and a second value "off," which may indicate that the first sender information is appended to the fax instruction information. The values in the switch-indicative flag to be stored in the data storage area 62B may be entered by the user, for example, through the input I/F 54.

Further, the terminal program 65 may execute the fax instruction transmission process based on the value in the switchable-indicative flag. For example, the terminal program 65 may execute S41 and onward when the switch-indicative flag indicates "on." Meanwhile, when the switch-indicative flag indicates "off," the terminal program 65 may execute S45 without executing S41-S44.

According to the embodiment described above, the terminal program 65 may store the first sender information received in S44 in the data storage area 62B. Thereafter, in response to executing S45, the terminal program 65 may delete the first sender information from the data storage area 62B. Thereby, in order for the terminal program 65 to execute S45 each time, it may be necessary that the terminal program 65 be authorized by the MFP 10. Thereby, malicious acts such as masquerade by another user may be restricted. On the other hand, the terminal program 65 may use in S45 the first sender information stored in the data storage area 62B for a second or onward round in the fax instruction transmitting process. In other words, the terminal program 65 may omit S43, S44 in the second or onward round.

According to the embodiment described above, the terminal program 65 manipulates the MFP 10 identified by the device ID, which was received through the NFC communication I/F 55, to execute the fax transmitting action. In other words, the user of the mobile terminal 50 may place the mobile terminal 50 over one of a plurality of MFPs 10 to manipulate the MFP 10 to activate the fax transmitting action. In this regard, however, methods to designate the facsimile device to be manipulated to activate the fax transmitting action may not necessarily be limited to the one described above. For example, the terminal program 65 may allow the user to designate one of facsimile devices, which may communicate with each other, through the input I/F 54.

According to the embodiment described above, the terminal program 64 may transmit the authentication key corresponding to the device ID, which is received from the MFP 10 through the NFC communication I/F 55, to the MFP 10 identified by the device ID. However, methods to obtain the authentication key to be transmitted may not necessarily be limited to the one described above. For example, the terminal program 65 may accept the input operation by the user to enter the authentication key through the input I/F 54. In this regard, the device program 35 may manipulate the display 23 to display the authentication key in S16 or manipulate the printer 11 to record an image that exhibits the authentication key.

According to the embodiment described above, the processes in the system 100 according to the present embodiment may be controlled by the programs 35, 65, which are stored in the program storage areas 32A, 62A, being executed by the CPUs 31, 61 of the MFP 10 and the mobile terminal 50, respectively. However, the control may not be necessarily be implemented by the programs as described above but may be, for example, either partly or entirely, implemented by a hardware device such as an IC.

Further, the present disclosure may not necessarily be implemented by the MFP 10 or the mobile terminal 50 but may be implemented by programs that may control the MFP 10 and the mobile terminal 50 to execute the above-described processes. Such programs may be recorded in non-transitory recording media to be provided to users. The non-transitory recording media may include, for example, a CD-ROM, a DVD-ROM, and a storage device installed in a server, which is connectable with the MFP 10 and the mobile terminal 50 through the communication network 101. The programs stored in the storage device in the server may be distributed to communication-enabled devices through the communication network 101 in a form of information or signals.

Although an example of carrying out the present disclosure has been described, those skilled in the art will appreciate that there are numerous variations and permutations of the programs and the facsimile device that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

What is claimed is:

1. A non-transitory computer-readable recording medium storing computer-readable instructions for a mobile terminal comprising a communication interface, the computer readable instructions, when executed by a processor of the mobile terminal, causing the mobile terminal to:
   transmit authentication information to a facsimile machine capable of executing a facsimile transmitting action through the communication interface, the authentication information indicating that the mobile terminal is authorized to instruct the facsimile machine to execute the facsimile transmitting action with use of first sender information; the first sender information being registered with the facsimile machine to indicate a sender of image data to be transmitted in the facsimile transmitting action;
   determine receipt of the first sender information transmitted in reply to the authentication information from the facsimile machine through the communication interface;
   transmit first facsimile instructing information to the facsimile machine through the communication interface in response to determination of receiving the first sender information transmitted by the facsimile machine, the first facsimile instructing information including information to instruct the facsimile machine to execute the facsimile transmitting action with use of the received first sender information; and
   transmit second facsimile instructing information to the facsimile machine through the communication interface in response to determination of not receiving the first sender information from the facsimile machine, the second facsimile instructing information including information to instruct the facsimile machine to execute the facsimile transmitting action without using the first sender information, second sender information, and information to instruct the facsimile machine to execute the facsimile transmitting action with use of the second sender information, the second sender information being information different from the first sender information and stored in the memory to indicate another sender of the image data to be transmitted in the facsimile transmitting action.

2. The non-transitory computer-readable recording medium according to claim 1, wherein the communication interface in the mobile terminal includes a first communication interface, through which the mobile terminal communicates wirelessly with an external device, and a second communication interface, of which wireless communication range is smaller than a wireless communication range of the first communication interface, the mobile terminal comprising a memory;
   wherein the computer readable instructions, when executed by the processor of the mobile terminal, further cause the mobile terminal to:
   receive the authentication information from the facsimile machine through the second communication interface;
   store the authentication information received through the second communication interface in the memory of the mobile terminal; and
   transmit one of the first facsimile instructing information in response to the determination of receiving the first sender information and the second facsimile instructing information in response to the determination of not receiving the first sender information to the facsimile machine through the first communication interface.

3. The non-transitory computer-readable recording medium according to claim 2, wherein the first communication interface is configured to communicate with the facsimile machine wirelessly in indirect wireless communication through a relaying device and in direct wireless communication without being relayed by the relaying device;

wherein the computer readable instructions, when executed by the processor of the mobile terminal, further cause the mobile terminal to:

receive connection information from the facsimile machine that transmitted the authentication information through the second communication interface, the connection information being required for the mobile terminal to establish the direct wireless communication with the facsimile machine; and transmit the first facsimile instructing information, in response to the determination of receiving the first sender information; to the facsimile machine in the direct wireless communication established based on the received connection information.

4. The non-transitory computer-readable recording medium according to claim 1, wherein the first facsimile instructing information includes information to control the facsimile machine to generate first combined image data by appending an image exhibiting the first sender information to the image data and control the facsimile machine to execute the facsimile transmitting action with the generated first combined image data;

wherein the second facsimile instructing information includes second combined image data, in which an image exhibiting the second sender information is appended to the image data, and information to instruct the facsimile machine to execute the facsimile transmitting action with the second combined data; and wherein the computer readable instructions, when executed by the processor of the mobile terminal, further cause the mobile terminal to generate the second combined image data prior to transmission of the second facsimile instructing information to the facsimile machine in response to the determination of not receiving the first sender information.

5. The non-transitory computer-readable recording medium according to claim 1, wherein the first facsimile instructing information includes first combined image data, in which an image exhibiting the first sender information is appended to the image data, and information to instruct the facsimile machine to execute the facsimile transmitting action with the first combined image data;

wherein the second facsimile instructing information includes second combined image data; in which an image exhibiting the second sender information is appended to the image data, and information to instruct the facsimile machine to execute the facsimile transmitting action with the second combined data; and wherein the computer readable instructions, when executed by the processor of the mobile terminal, further cause the mobile terminal to:

generate the first combined image data prior to transmission of the first facsimile instructing information to the facsimile machine in response to the determination of receiving the first sender information; and generate the second combined image data prior to transmission of the second facsimile instructing information to the facsimile machine in response to the determination of not receiving the first sender information.

6. A non-transitory computer-readable recording medium storing computer-readable instructions for a mobile terminal comprising an input interface and a communication interface, the computer readable instructions, when executed by a processor of the mobile terminal, causing the mobile terminal to:

accept one of a first instructing operation and a second instructing operation through the input interface, the first instructing operation corresponding to an instruction for a facsimile machine to execute a facsimile transmitting action with use of first sender information, the first sender information being registered with the facsimile machine to indicate a sender of image data to be transmitted in the facsimile transmitting action, and the second instructing operation corresponding to an instruction for the facsimile machine to execute the facsimile transmitting action without using the first sender information;

receive the first sender information from the facsimile machine through the communication interface and transmit first facsimile instructing information to the facsimile machine through the communication interface in response to acceptance of the first instructing operation, the first facsimile instructing information including information to instruct the facsimile machine to execute the facsimile transmitting action with use of the received first sender information; and transmit second facsimile instructing information to the facsimile machine through the communication interface in response to acceptance of the second instructing operation, the second facsimile instructing information including information to instruct the facsimile machine to execute the facsimile transmitting action without using the first sender information, second sender information and information to instruct the facsimile machine to execute the facsimile transmitting action with use of the second sender information, the second sender information being information different from the first sender information and stored in the memory to indicate another sender of the image data to be transmitted in the facsimile transmitting action.

7. The non-transitory computer-readable recording medium according to claim wherein the computer readable instructions, when executed by the processor of the mobile terminal, further cause the mobile terminal to transmit authentication information to the facsimile machine through the communication interface in response to the acceptance of the first instructing operation, the authentication information indicating that the mobile terminal is authorized to instruct the facsimile machine to execute the facsimile transmitting action with use of the first sender information;

determine receipt of the first sender information transmitted in reply to the authentication information from the facsimile machine through the communication interface;

transmit the first facsimile instructing information to the facsimile machine through the communication interface in response to determination of receiving the first sender information; and transmit the second facsimile instructing information to the facsimile machine through the communication interface in response to determination of not receiving the first sender information.

8. The non-transitory computer-readable recording medium according to claim 7, wherein the first instructing operation corresponds to a reading action, in which the facsimile machine reads an image recorded on an original sheet and generates the image data, and to the facsimile transmitting action, in which the image data generated in the reading action is transmitted;

wherein the second instructing operation corresponds to the facsimile transmitting action, in which the image data stored in a memory of the mobile terminal is transmitted; and wherein the computer readable instructions, when executed by the processor of the mobile terminal, cause the mobile terminal to:

transmit the first facsimile instructing information, which does not include the image data to be transmitted in the facsimile transmitting action, to the facsimile machine through the communication interface in response to the determination of receiving the first sender information; and transmit the second facsimile instruction information, which includes the image data stored in the memory of the mobile terminal and designated through the input interface of the mobile terminal, to the facsimile machine through the communication interface in response to the determination of not receiving the first sender information.

9. The non-transitory computer-readable recording medium according to claim 7, wherein the computer readable instructions, when executed by the processer of the mobile terminal, further cause the mobile terminal to:

transmit inquiry information to the facsimile machine through the communication interface, the inquiry information including information to inquire of the facsimile machine whether the first sender information to be used in the facsimile transmitting action is switchable;

determine receipt of switchable-indicative information transmitted in reply to the inquiry information from the facsimile machine, the switchable-indicative information indicating that the sender information to be used in the facsimile transmitting action is switchable;

accept one of the first instructing operation and the second instructing operation in response to determination of receiving the switchable-indicative information; and accept the second instructing operation alone in response to determination of not receiving the switchable-indicative information.

10. The non-transitory computer-readable recording medium according to claim 7, wherein the communication interface in the mobile terminal includes a first communication interface, through which the mobile terminal communicates wirelessly with an external device, and a second communication interface, of which wireless communication range is smaller than a wireless communication range of the first communication interface, the mobile terminal comprising a memory;

wherein the computer readable instructions, when executed by the processor of the mobile terminal, further cause the mobile terminal to:

receive the authentication information from the facsimile machine through the second communication interface;

store the authentication information received through the second communication interface in the memory of the mobile terminal; and transmit one of the first facsimile instructing information in response to the determination of receiving the first sender information and the second facsimile instructing information in response to the determination of not receiving the first sender information to the facsimile machine through the first communication interface.

11. The non-transitory computer-readable recording medium according to claim 10, wherein the first communication interface is configured to communicate with the facsimile machine wirelessly in indirect wireless communication through a relaying device and in direct wireless communication without being relayed by the relaying device;

wherein the computer readable instructions, when executed by the processor of the mobile terminal, further cause the mobile terminal to:

receive connection information from the facsimile machine that transmitted the authentication information through the second communication interface, the connection information being required for the mobile terminal to establish the direct wireless communication with the facsimile machine; and transmit the first facsimile instructing information to the facsimile machine in the direct wireless communication established based on the received connection information.

12. The non-transitory computer-readable recording medium according to claim 6, wherein the first facsimile instructing information includes information to control the facsimile machine to generate first combined image data by appending an image exhibiting the first sender information to the image data and control the facsimile machine to execute the facsimile transmitting action with the generated first combined image data;

wherein the second facsimile instructing information includes second combined image data, in which an image exhibiting the second sender information is appended to the image data, and information to instruct the facsimile machine to execute the facsimile transmitting action with the second combined data; and wherein the computer readable instructions, when executed by the processor of the mobile terminal, further cause the mobile terminal to generate the second combined image data prior to transmission of the second facsimile instructing information to the facsimile machine in response to the acceptance of the second instructing operation.

13. The non-transitory computer-readable recording medium according to claim 2, wherein the first facsimile instructing information includes first combined image data, in which an image exhibiting the first sender information is appended to the image data, and information to instruct the facsimile machine to execute the facsimile transmitting action with the first combined image data;

wherein the second facsimile instructing information includes second combined image data, in which an image exhibiting the second sender information is appended to the image data, and information to instruct the facsimile machine to execute the facsimile transmitting action with the second combined data; and wherein the computer readable instructions, when executed by the processer of the mobile terminal, further cause the mobile terminal to:

generate the first combined image data prior to transmission of the first facsimile instructing information to the facsimile machine in response to the determination of receiving the first sender information; and generate the second combined image data prior to transmission of the second facsimile instructing information to the facsimile machine in response to the determination of not receiving the first sender information.

14. A system, comprising:

a mobile terminal comprising a first communication interface and a memory;

a facsimile machine comprising:

a second communication interface;

a facsimile device configured to execute a facsimile transmitting action;

a storage device, in which first sender information is registered, the first sender information being registered with the facsimile machine to indicate a sender of image data to be transmitted in the facsimile transmitting action; and an input device configured to accept one of a first instructing operation and a second instructing operation, the first instructing operation corresponding to an instruction for the facsimile machine to execute the facsimile transmitting action with use of the first sender information, and the second instructing operation corresponding to an instruction for the facsimile machine to execute the facsimile transmitting action without using the first sender information, wherein the mobile terminal further comprises a transmitter device, the transmitter device being configured to transmit facsimile instructing information to the facsimile machine through the first communication interface on condition that the second instructing operation is accepted in the input device, the facsimile instructing information including second sender information, the second sender information being stored in the memory to indicate another sender of the image data to be transmitted in the facsimile transmitting action; and wherein the facsimile device is configured to execute the facsimile transmitting action with use of the first sender information on condition that the first instructing operation is accepted in the input device, the facsimile device being configured to execute the facsimile transmitting action with use of the second sender information transmitted from the second transmitter device and received in the facsimile machine through the second communication interface.

* * * * *

UNITED STATES PATENT AND TRADEMARK OFFICE
CERTIFICATE OF CORRECTION

PATENT NO. : 10,638,015 B2  
APPLICATION NO. : 15/274231  
DATED : April 28, 2020  
INVENTOR(S) : Eiji Arakawa Page 1 of 1

It is certified that error appears in the above-identified patent and that said Letters Patent is hereby corrected as shown below:

In the Claims

Claim 3, Column 21, Line 6: Delete "processer" and insert -- processor --, therefor.

Claim 4, Column 21, Line 37: Delete "processer" and insert -- processor --, therefor.

Claim 5, Column 21, Line 59: Delete "processer" and insert -- processor --, therefor.

Claim 6, Column 22, Line 8: Delete "processer" and insert -- processor --, therefor.

Claim 7, Column 22, Line 46: Delete "claim" and insert -- claim 6, --, therefor.

Claim 7, Column 22, Line 47: Delete "processer" and insert -- processor --, therefor.

Claim 9, Column 23, Line 30: Delete "processer" and insert -- processor --, therefor.

Claim 10, Column 23, Line 58: Delete "processer" and insert -- processor --, therefor.

Claim 13, Column 24, Line 51: Delete "claim 2," and insert -- claim 6, --, therefor.

Claim 13, Column 24, Line 66: Delete "processer" and insert -- processor --, therefor.

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*